United States Patent
Salkeld et al.

(10) Patent No.: US 8,332,434 B2
(45) Date of Patent: Dec. 11, 2012

(54) METHOD AND SYSTEM FOR FINDING APPROPRIATE SEMANTIC WEB ONTOLOGY TERMS FROM WORDS

(75) Inventors: Robin Salkeld, Vancouver (CA); Lushan Han, Baltimore, MD (US)

(73) Assignee: Business Objects Software Limited, Dublin (IE)

( * ) Notice: Subject to any disclaimer, the term of this patent is extended or adjusted under 35 U.S.C. 154(b) by 375 days.

(21) Appl. No.: 12/571,137

(22) Filed: Sep. 30, 2009

(65) Prior Publication Data
US 2011/0078205 A1    Mar. 31, 2011

(51) Int. Cl.
*G06F 7/04* (2006.01)
*G06F 17/30* (2006.01)
(52) U.S. Cl. ......... 707/794; 707/713; 707/723; 707/749
(58) Field of Classification Search .................. 707/2, 5, 707/7, 104.1, 999.002, 999.005, 999.007, 707/999.107, 713, 794, 723, 749, 999.1, 707/999.102
See application file for complete search history.

(56) References Cited

U.S. PATENT DOCUMENTS

| | | | |
|---|---|---|---|
| 7,493,253 B1 * | 2/2009 | Ceusters et al. | 704/9 |
| 2005/0216459 A1 * | 9/2005 | Vailaya et al. | 707/5 |
| 2009/0094262 A1 * | 4/2009 | Marvit et al. | 707/100 |
| 2010/0281025 A1 * | 11/2010 | Tsatsou et al. | 707/733 |
| 2011/0072051 A1 * | 3/2011 | Lyne et al. | 707/794 |

OTHER PUBLICATIONS

"Finding Appropriate Semantic Web Ontology Terms From Words," Han et al, May 2009, retrieved on Apr. 25, 2012 from http://ebiquity.umbc.edu/_file_directory/papers/453.pdf.*
"Towards a Semantic Representation of Documents by Ontology-Document Mapping," Baziz, AIMSA 2004, Springer-Verlag Berlin Heildelberg 2004.*
"An Information Retrieval Driven by Ontology from Query to Document Expansion," Baziz et al, published in RIAO '07 Le Centre de Hautes Etudes Internationales D'Informatique Documentaire, Paris, France (c)2007.*

* cited by examiner

*Primary Examiner* — Bruce Moser
(74) *Attorney, Agent, or Firm* — Buckley, Maschoff & Talwalkar LLC

(57) ABSTRACT

A system and method to map a set of words to a set of ontology terms, the method including determining a starting point for ontologies including terms matching a set of words, determining a term set corresponding to the set of words in an ontology context of each of the starting points, ranking the term sets determined for all of the starting points, and providing an output of the term sets in a ranked order.

21 Claims, 5 Drawing Sheets

300

```
┌─────────────────────────────────────────────┐
│   FIND A STARTING POINT FOR ONTOLOGIES      │
│      INCLUDING TERMS MATCHING A             │
│              SET OF WORDS                   │
│                                        305  │
└─────────────────────────────────────────────┘
                      │
                      ▼
┌─────────────────────────────────────────────┐
│ DETERMINE A TERM SET CORRESPONDING TO THE SET OF │
│   WORDS IN AN ONTOLOGY CONTEXT OF EACH OF THE    │
│               STARTING POINTS                    │
│                                        310  │
└─────────────────────────────────────────────┘
                      │
                      ▼
┌─────────────────────────────────────────────┐
│   RANK THE TERM SETS DETERMINED FOR ALL     │
│          OF THE STARTING POINTS             │
│                                        315  │
└─────────────────────────────────────────────┘
```

```
┌─────────────────────────────────────────┐
│   GENERATE A SEMANTICALLY-RELATED TERM  │
│   LIST FOR EACH WORD IN THE SET OF WORDS│
│                                     405 │
└─────────────────────────────────────────┘
                    │
                    ▼
┌─────────────────────────────────────────┐
│   COLLECTING, IN A DATA STRUCTURE, ALL  │
│   OF THE DIFFERENT NAMESPACES APPEARING │
│   IN THE TERMS IN EACH SEMANTICALLY-    │
│   RELATED TERM LIST GENERATED FOR EACH  │
│   WORD                                  │
│                                     410 │
└─────────────────────────────────────────┘
                    │
                    ▼
┌─────────────────────────────────────────┐
│   DETERMINE A NUMBER OF THE SET OF WORDS│
│   COVERED BY A NAMESPACE ONTOLOGY BASED │
│   ON THE NUMBER OF OCCURRENCES OF THE   │
│   NAMESPACE IN EACH DATA STRUCTURE      │
│                                     415 │
└─────────────────────────────────────────┘
```

*FIG. 4*

METHOD AND SYSTEM FOR FINDING APPROPRIATE SEMANTIC WEB ONTOLOGY TERMS FROM WORDS

BACKGROUND

The Semantic Web is realized as a huge graph of data and knowledge. The graph's nodes include literal values, individuals, and ontology terms representing classes and properties, and its edges represent statements of facts. Syntactically, an ontology term has two parts, a namespace identifying the ontology defining the ontology term and a local name identifying a term in the ontology. Namespaces act to resolve ambiguity by allowing terms in different ontologies to share the same local name. For example, the class "Party" can be defined in a "politics" ontology, as well as a "recreational activities" ontology. Authoring or querying knowledge on the Semantic Web is made difficult because it requires people to have some knowledge of the ontologies and to manually select ontologies for the concepts they want to describe, select, query, or otherwise use. For example, the term 'Party' is defined in over 400 Semantic Web ontologies currently known to the Semantic Web search engine Swoogle. Thus, a person would normally need some knowledge of the various ontologies in order to efficiently and effectively describe, search, select, search or otherwise work with the various ontologies. Additionally, other ontologies with local names such as, for example, "Celebration" and "Organization" may possibly define concepts related to the specific word "Party".

The Semantic Web was designed with a goal of unambiguously defining and using ontologies to encode data and knowledge on the World Wide Web. Resource Description Framework or RDF (specifications by World Wide Consortium, W3C,) was designed as a metadata data model and is used for modeling information, including Web resources However, it can be difficult to effectively write complex Resource Description Framework (RDF) statements and queries for the Semantic Web since doing so requires at least some familiarity with the appropriate ontologies and the terms defined by those ontologies.

Systems are desired to automatically map a set of ordinary natural language or vocabulary words to a set of corresponding appropriate ontology terms on the Semantic Web. Such systems should be able to operate on various data sources (including semantically-deprived data sources), ontology terms and ontology correlation statistics, resolve contextual meanings, and provide an efficient mechanism for finding the most suitable ontology context as well as appropriate ontology terms, given an input of natural language or vocabulary words. Desired are systems and methods that provide a mechanism for a user to use natural language or vocabulary as an input and that provide the user with appropriate Semantic Web ontology terms corresponding to the input of the natural language or vocabulary words.

BRIEF DESCRIPTION OF THE DRAWINGS

FIG. 3 is a workflow diagram, according to some embodiments;

FIG. 4 is a graph related to some embodiments herein; and

DETAILED DESCRIPTION

Figure 1:
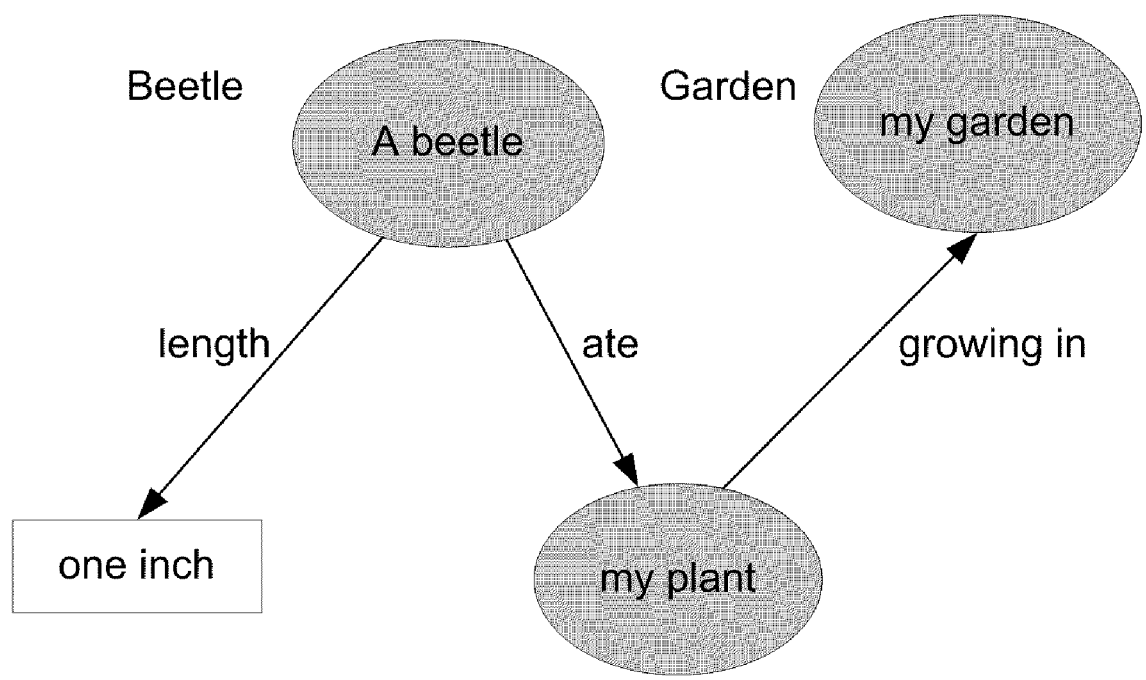
FIG. 1 is a semantic graph, in accordance with some embodiments.

The following description is provided to enable any person in the art to make and use the described embodiments. Various modifications, however, will remain readily apparent to those in the art.

In some aspects, embodiments herein may be related to the problem of word sense disambiguation in computational linguistics. However, the embodiments herein are not based on a single universe of senses derived from a data source such as, for example WordNet or Roget's Thesaurus, but instead are drawn from a distributed and evolving collection of published ontologies where many duplicated concepts exist (e.g., Semantic Web). Moreover, Natural Language Processing (NLP) systems mainly focus on word sense disambiguation in text itself while aspects of some embodiments herein relate to encoding and retrieving structured data in a manner that facilitates data sharing and integration without limiting the expressive power of users.

In some embodiments, the methods and systems herein may be applied to encode structured (e.g., eXtensible Markup Language, or XML) and semi-structured data where an input graph including word labels associated with the data can be provided or parsed from the data. Such embodiments may support metadata systems such as, for example, Resource Description Framework in attributes (RDFa) per W3C or Flickr's machine tags that use qualified namespaces whose selection may not be intuitively understood by users having little or no knowledge of ontologies.

As used herein, the terms "natural language" or "vocabulary" describe a word or phrase of words that are not constrained by any particular set of rules, constraints, form, or syntax that may govern terms such as those used or accessed by a computer, machine, or processors. Instead of being limited to a particular set of rules, constraints, forms, or syntax, "natural language" or "vocabulary" words or phrases are free to be any of the words or phrases used by people in natural usage, whether spoken or written, to describe, express, or explain concepts.

Given a single natural language or vocabulary word or short phrase, there exists the problem of how to determine which Semantic Web ontology term should be mapped to the single natural language or vocabulary word or short phrase. Merely asking or querying a Semantic Web search engine, such as Swoogle or Sindice, to return the most highly ranked terms with a corresponding local name is insufficient since a user would normally have to manually disambiguate the terms and possibly need expand the query with synonyms in order to obtain sufficient search results. Additionally, some common use scenarios may use a set of words rather than a single word. However, the process of successively mapping a single word at a time from a set of words while maintaining the consistency of the terms in the phrase is laborious and computationally expensive.

Another approach to this problem is to find a single Semantic Web ontology such that the entire set of words in the phrase can be matched by the terms defined by the single Semantic Web ontology, where a matching term has a local name that is either the same as the matched word or a synonym of it. This approach may work because Semantic Web ontologies (also referred to as simply ontologies herein) are typically small and context-specific. Most ontologies define a set of terms for a limited number of highly related concepts. Example ontologies include "Friend of a friend" (FOAF) for a personal profile, "WGS84 Geo Positioning" (GEO) for geographical position, and "Creative Commons" (CC) for licenses. In the instance a phrase (i.e., a set) of words can all be matched by the terms of a single context-specific ontology, it is likely that the set of words composing the phrase have close contexts and consequently the terms of the context-specific ontology should be a good map of the set of words. For example, consider the short sentence, "A one inch long beetle ate my plant growing in my garden" represented as a semantic graph 100 in FIG. 1. The six words "beetle", "plant", "garden", "ate", "growing" and "length" together may indicate a specific context and within this specific context, the words may be disambiguated. Thus, if a context-specific Semantic Web ontology can be found that defines all six of the terms with corresponding local names, then the class "Beetle" should more likely mean the insect beetle rather than the car referred to as a beetle and the class "Plant" should more likely refer to a plant organism rather than a factory, power station, etc.

However, a problem with the example of FIG. 1 is that terms (e.g., "beetle", "plant", "garden", "ate", "growing" and "length") may come from multiple ontologies. Instead of a single "Things in a Garden" ontology that contains all six of the term, the terms may instead be contained three different ontologies such as, for example, a "Beetle" ontology, a "Plant" ontology, and a "Garden" ontology.

It is noted that it is not uncommon for people to use terms in different ontologies in authoring an RDF document. This practice bestows upon Semantic Web ontologies the feature of ontologies that can be connected by their co-occurrences in existing RDF documents. Based on this feature, an ontology co-occurrence network (OCON) may be formed having ontologies with weighted edges indicating how strongly the ontologies are connected to each other.

In the ontology co-occurrence network, each ontology has a context that is no longer confined to the terms it alone defines but also includes the terms defined in its neighboring ontologies.

Figure 2:
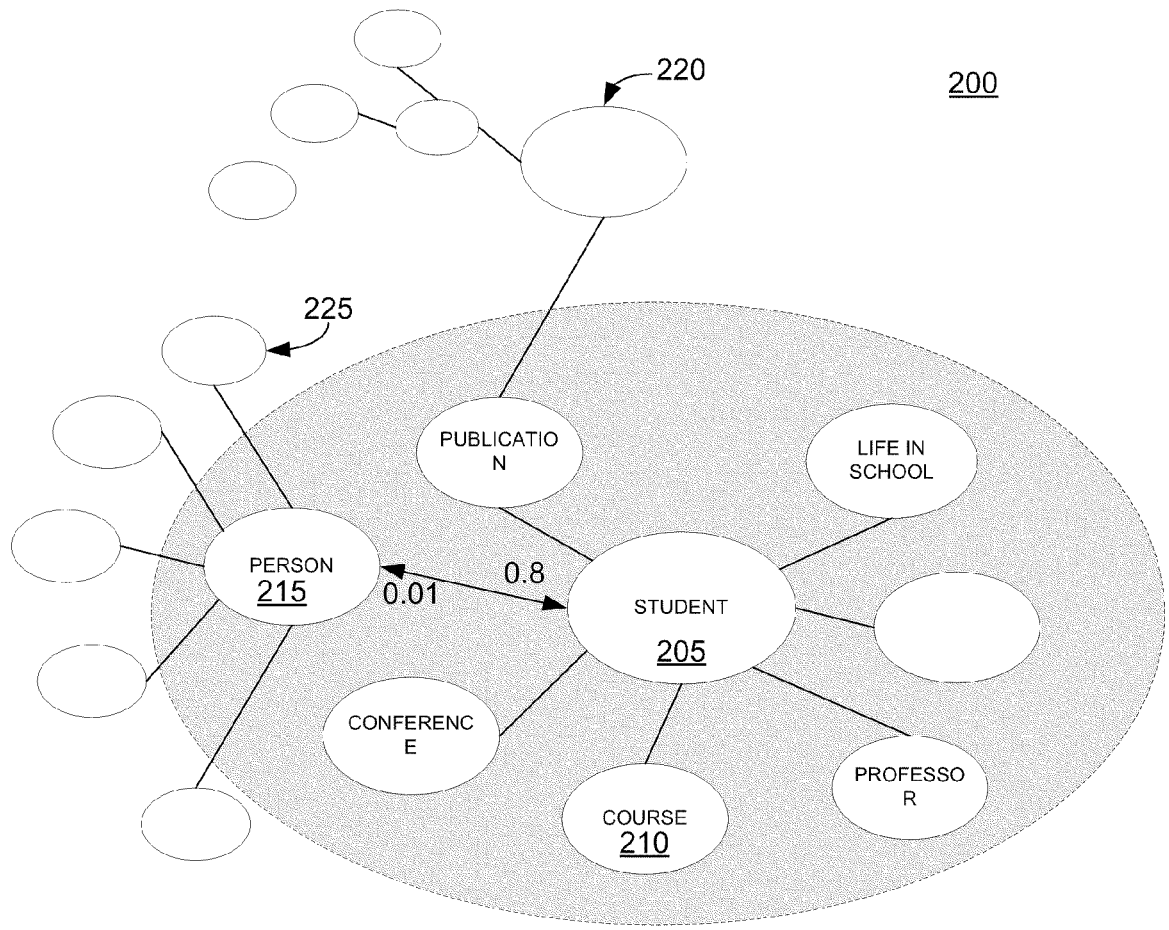
FIG. 2 is an illustrative depiction of an ontology context, according to some embodiments.

FIG. 2 provides an illustrative example of an ontology context 200. An ontology context includes a central ontology and its associated neighboring ontologies. According to how strongly a neighboring ontology is connected to the central ontology from the perspective of the central ontology, the terms defined in a neighboring ontology are assigned a corresponding weight in the context of the central ontology. Referring to FIG. 2, the terms in the central ontology 205 have a weight of one, whereas the terms in the associated neighboring ontologies (e.g., Course 210, Person 215, etc.) have a weight less than one.

Although shown as mostly undirected, each edge of the ontologies actually consists of two directed edges with different weights. The weight of the directed edge from ontology A to ontology B is the conditional probability of A accompanying B in an RDF document. Two connected ontologies can have very different ontology contexts. For example, the Student ontology 205 and the Person ontology 215 are connected ontologies. The most weighted terms in the ontology context of Student may come from the Student, Person, Course and other strongly connected ontologies. Yet, all of these terms, except for the terms in the Person ontology, should not be the most weighted terms in the ontology context of Person, considering the number of different ontologies that could be connected with the Person ontology. The shaded area of FIG. 2 represents the ontology context of the Student ontology. The Person ontology 215 has a conditional probability of 0.8 of accompanying the Student ontology 205, while the Student ontology 205 has a conditional probability of 0.01 of accompanying the Person ontology 215. It is noted that the directional arrows have largely not been shown in FIG. 2 in order to preserve the clarity of the drawing.

In some embodiments, the weights may be assigned and/or valued differently than the specific manner introduced above, which is but one example that may be effective for assigning weights to the terms in an ontology context.

Finding the most consistent terms for a given set of words is actually the same question as finding the most related ontology context for the words. This can be achieved by finding the ontology context that returns the highest weight sum of its terms that match the input words, where the weight of a term is equal to the weight of its ontology. For example, suppose we have six words: 'name', 'birthday', 'sex', 'major', 'GPA' and 'take course' where 'name', 'birthday' and 'sex' are defined as terms in the Person ontology and 'major', 'GPA' and 'take course' are defined in the Student ontology 205 of FIG. 2. The Student ontology 205 is more related with the six words than the Person ontology 215 Student ontology 205 returns a higher weight sum of the matching terms. The most related ontology context tends to center on the ontology defining the most specific concept conveyed in the input words. Determining and choosing the most related ontology context that centers on the ontology defining the most specific concept conveyed in the input words greatly reduces the ambiguity the terms may have.

In determining the most related ontology context, care is taken to also measure how well the terms match the input words. However, matching a word or short phrase to the local name of an ontology term is not a trivial matter. Synonyms and morphological variants of language and vocabulary words may need to be considered.

Another issue for consideration is the computation time that may be needed to make the determinations herein. For each word in the input set, a term list containing all of the semantically related ontology terms may be generated. However, the number of all possible term sets composed by picking one term from each different term list may be huge. Also, the number of all possible ontology contexts is equal to the number of ontologies in a database or data set under consideration. For example, Swoogle recently reported approximately twenty-five thousand ontology contexts. Evaluating each possible term set for each possible ontology context is computationally expensive and may, in some instances, be impractical.

Besides relatedness (i.e., how well ontology terms match the input words), popularity is also an important concern in selecting an ontology context. Since any person may compose their own ontology on the Semantic Web, many ontologies overlap in the concepts they define. Choosing the most popular ontology is beneficial because it helps to ensure that the same concept is encoded with the same terms, and also because popularity is a de facto main indicator for measuring trust on the Web.

Further detailed disclosure herein will provide a practical approach, method, and system to find the most suitable ontology context and appropriate ontology terms in the Semantic Web for a set of natural language words or short phrases.

A motivation of the system herein is to allow users to use ordinary English words or short phrases in authoring an RDF graph involving several related concepts. Accordingly, the input of the methods and systems herein is the set of language or vocabulary words in the graph plus an indication of whether each word is used as a class or as a property. Referring again to the graph of FIG. 1, the input set includes "Beetle", "Plant", "Garden" as classes and "ate", "growing in", "length" as properties. The input does not include the property values, such as "one inch" because class names and property names are identifiers for concepts but property values are mostly used to identify instances. Even when an instance can be identified, it is often not known which type is appropriate in the target context since an instance can have many types. By specifying whether an input vocabulary word acts as a class or a property, part of the structure information of the graph is included in the input.

However, in some embodiments, the structure information about which property word is applied on which class word is not included in the input. Using such information requires a preliminary knowledge of which property can be applied on which class on the Semantic Web. Having this level of knowledge requires a greater understanding and may require collecting and learning the domain of Semantic Web properties, building global class taxonomy and even ontology mapping. An aspect of various embodiments herein is that no such knowledge is required or necessary. Accordingly, some embodiments are based on analyzing the co-occurrences of ontologies (concepts) and the terms (cluster of identifiers) defined for each ontology.

In some embodiments, an output is provided as a number (e.g., twenty) of ranked term sets, where each term set is a possible mapping for the input words. The term sets are ranked by a score given by a "goodness" function (as will be discussed in greater detail below), which considers both a consistency and a popularity of the results. Within each term set, an input word or short phrase is matched to a select number (e.g., three) of candidate Semantic Web ontology terms.

The reason more than one option is provided in the result term set is that word ambiguity may occur even within a certain ontology context. The ambiguity may be caused by the semantic subtlety that may be difficult to distinguish by only looking at the lexical name of a term. Consequently, the result output term sets may include more than one option so that a person may manually choose an alternative to a default term. Additionally, in some embodiments, the output may further include term metadata (e.g., labels, comments, domain, range, etc.) that may further distinguish the individual terms from each other and provide additional information.

In some embodiments, an efficient mechanism is provided to determine the most suitable ontology context and terms for a given set of input words. In accordance herewith, an ontology context has a central ontology. An overview of the mechanism includes a first step to find appropriate central ontologies to use as starting points of ontology contexts. Next, in the ontology context of each starting point, a set of the most appropriate terms (i.e., a term set) matching the input words is determined. Finally, the term sets acquired from each of the starting points are ranked using a "goodness" function considering both consistence and popularity. A number of the top term sets (e.g., the top 20) are then presented as an output.

Prior to discussing some embodiments in greater detail, two relevant data structures will be discussed. The two data structures are based on a collection (e.g., database) of Semantic Web data. The data may include, for example, a snapshot of Swoogle's data that has more than three million RDF documents, about twenty-five thousand (25,000) of which are ontologies that define terms. One data structure is an ontology co-occurrence network data structure that is constructed using namespace correlations in all of the RDF documents of the Semantic Web data. The ontology co-occurrence network may be stored in a memory for retrieval, access, upgrading, querying, etc. The second data structure constructed based on the Semantic Web data is a term index. The term index contains all valid terms in the snapshot data. As used herein, a term is valid if it is defined in the ontology identified by the term's namespace. Further, it is assumed that a term is valid if its namespace is not an accessible Universal Resource Identifier or URI or there does not exist an ontology at the namespace URI.

The total number of terms in the term index constructed and considered herein based on a particular collection of Semantic Web data is about four million. However, the particular size of the term index may vary depending on the size of the underlying data set. The term index may be constructed using a text indexing and searching application such as, for example, Apache Lucene supported by the Apache Software Foundation. A tokenized index may be performed on the local name of a term to enable search terms using keywords appearing in the local name. In some embodiments, a customized tokenizer may be used that considers conventions used by a user to create local names. As an example, 'PhDStudent' may be tokenized as 'Ph D Student', a typical user convention. In some embodiments, an index of the type field of a term may be provided so that terms may be retrieved according to their given type—either 'class' or 'property'.

In some embodiments, additional or selected properties of a term may be stored or associated with the term index. Such additional or selected properties may include the namespace of the term, the total number of terms being defined in the namespace ontology, the global term rank, as well as other properties.

FIG. 3 provides a process for determining the most suitable ontology context(s) and terms for a given set of input words. A first step of some embodiments herein includes finding the appropriate starting points of ontology contexts, as illustrated at operation 305. In some embodiments, a prerequisite to an ontology becoming a starting point is that a potential or target ontology has a cover rate of the input words above a designated threshold. While it may be desired to find a good term set in the ontology context of every starting point (i.e., the starting points are complete) and thereby limit computation time spent on searching irrelevant ontology contexts, it may also be desired that the central ontologies of the most suitable ontology contexts be covered by the starting points (i.e., the starting points are precise). The competing interests of completeness and precision may be addressed and adjusted by the cover rate threshold and the varying of same.

Prior to explaining what a cover rate is, some background definitions are provided.

- Definition 1: The local name of a term is referred to herein as being semantically-related with a natural language or vocabulary word when one of the vocabulary word's synonyms, in any inflexed form, exists in the local name.
- Definition 2: The local name of a term is referred to herein as being semantically-related with a phrase when all of the words in the phrase exist as keywords in the local name, without considering their order. In some embodiments, stop words such as, "a", "an", "is", "be", etc. are ignored.
- Definition 3: A natural language or vocabulary word or short phrase is referred to herein as being to be covered by an ontology if the ontology defines a term whose local name is semantically-related with the natural language or vocabulary word or short phrase and whose type (either class or property) is the same as the given input type of the natural language word.

Precisely determining whether two words or short phrases have the same meaning is a complex task since there may be many different ways to express the same concept. As an example, the words (i.e., phrases) 'take course', 'enrolled in', 'register course', 'has course', and even the word 'course' may all mean the same thing. As used herein, a "semantically-related" relationship indicates the local name of the term has a potential to share the same meaning with the word or short phrase.

It is noted that a semantically-related relationship is different from a semantic association. The two words 'horse' and 'rider' may have a significant semantic association but they are not semantically-related. That is, the words do not have the same meaning. Furthermore, the more semantically-related relationships that exist between a set of input words and a context-specific ontology, then the more probable it is that the set of input words and the context-specific ontology have close or closely related contexts.

The cover rate is defined herein as the number of covered words or phrases divided by the total number of input words or phrases. In some embodiments, a cover rate threshold of ⅕ is used based on Applicant's realization that the number of ontologies used in an RDF document may, in a number of instances, be limited to no more than five (5) and one or two of those ontologies are core ontologies whose terms are more heavily used than others. Accordingly, a cover rate threshold of ⅕ may operate to guarantee that at least the core ontologies used in authoring an RDF document or RDF fragment can pass the threshold. The cover rate threshold is a tuning parameter and may be varied, determined, or otherwise set to be a value between zero and one (1).

In some embodiments, all of the ontologies that satisfy the cover rate threshold are determined and noted (e.g., saved or indexed to a memory). Process 400 of FIG. 4 depicts a method for determining the starting points discussed at operation 305. At operation 405, a semantically-related term list is generated for each input word or short phrase. At operation 410, a hash set, other data structure, or mechanism is used to contain or collect all of the different namespaces appearing in the terms in each semantically-related term list, respectively. At operation 415, a count of the number of the occurrences of a namespace in the different hash sets is determined to be the number of input words being covered by the namespace ontology.

In this manner and in accordance with process 400, all of the ontologies that satisfy the cover rate threshold may be determined and noted, indicated, or saved for further processing.

The term index data structure may be used to determine the semantically-related term list for any given natural language or vocabulary word or short phrase. As an example, a collection of data or a database such as the lexical database WordNet may be used to find all of the synonyms of a word or short phrase. The synonyms of a word may be defined as all of the words in the synsets of the first two senses of the target word that are also used as their first or second sense (i.e., first two senses). In some embodiments, words in the synsets of infrequently used senses are not used since they may introduce additional and/or unnecessary ambiguity. The stem of each synonym that is a word may be determined and appended with a wildcard character (e.g., "*"), whereby a query (e.g., using Lucene) may be composed to search the local names of terms. The query can return a list of terms that conforms to the wild card pattern. Filtering may be provided to filter out those terms in the term list that do not share the same stem as the synonym. In the instance the synonym is a phase, a query using the Boolean "AND" operator may be used without performing the stemming operation on each word in the phrase. All of the terms in each of the lists populated for each synonym may be combined to form the semantically-related term list for the input word or phrase. In this manner a global semantically-related term list may be generated.

In some embodiments, a term's metadata such as, for example, its namespace, its global rank, etc may be obtained from the term index and stored with the result terms in the term list in memory.

In some embodiments, not all of the ontologies that pass the cover rate threshold are used as starting points. Instead, the number of ontologies used as starting points may be selectively limited or otherwise constrained to a set number. Reasons for limiting the number of ontology starting points may include, for example, considerations of computing time and resources that may impact system response time and avoiding the use of large and broad ontologies (e.g. Cycorp's "Cyc" ontology) as our starting points in an instance where sufficiently many other context-specific ontologies qualify. Accordingly, candidate starting point ontologies may be ranked (using a formula described in greater detail below) and the top three hundred (300) or other number of ontologies may be selected for further use and consideration. The number of selected ontologies may be determined, at least in part, based on providing a real time response in a computer system implementing aspects herein and the number of ontologies that satisfy the cover rate.

In some embodiments, a formula for ranking the ontologies is proportional to the product of the cover rate and the popularity of the ontology and inversely proportional to the size of the ontology. An example of the formula is:

$$\text{score} = \frac{\text{cover rate} \cdot \text{popularity}}{\text{size}}. \tag{1}$$

where cover rate denotes the percentage of the input natural language or vocabulary words or short phrases that are covered by the ontology, popularity denotes how many times the ontology is used in the existing RDF documents, and size denotes the number of terms defined in the ontology. As illustrated by equation (1), a low priority is given to broad, big ontologies (e.g. CYC) since size is inversely proportional to the score.

It is noted that while the starting point ontologies receive different rank scores in connection with operation 305 of process 300 based on equation (1), the starting point ontologies will be treated equally in the following steps since appropriate terms are determined based on the ontology context of a starting point and not limited to the starting point ontology itself.

An example of psuedo code related to operation 305 of FIG. 3 for finding the starting points is provide as follows:
Find-Starting-Points(wordSet, startingPoints)
Input: wordSet is a set of words $\{w_0, w_1, \ldots, w_i, \ldots, w_{n-1}\}$ where $w_i$ is a pair of <word, type>.
Output: startingPoints is the set of starting points

| | |
|---|---|
| 1 | for each $w_i \in$ wordSet |
| 2 | if $w_i$ -> word is an existing key in the pair-wise term list wordSet of words |
| 3 | then get semantically related term list list$_i$ from the pair-wise term list wordSet of words |
| 4 | else generate semantically related term list list$_i$ from TI |
| 5 | put the pair < $w_i$, List$_i$ > to the pair-wise term list wordSet of words |
| 6 | use a hash set namespaceSet$_i$ to contain all the different namespaces in list$_i$ |
| 7 | count the number of the occurrences of each namespace j in all the namespaceSet$_i$ with different i |
| 8 | compute the cover rate of input words for the namespace j |

-continued 9  collect the namespaces whose cover rate is above
   the threshold (e.g., 1/5)
10 sort the namespaces according to the ranking formula, equation (1)
11 put top 300 (or some other number of the namespaces,
   incuding a minimum value and/or a maximum value, a
   percentage of the ranked namespaces, etc.) to startingPoints
12 return startingPoints At operation 310, terms for each input word in the ontology context associated with the starting point ontologies are determined. The search for appropriate terms corresponding to the input word(s) is now narrowed to the terms within the ontology context of a starting point.

As discussed above, the term list generated for each input word based on the term index is a global semantically-related term list. The global term list generated for each input word may be provided prior to, as part of, or after operation 305.

Returning to operation 310, a local semantically-related term list is generated for each input word by scanning the global semantically-related term list and selecting the terms whose namespaces are either the starting point (i.e., central) ontology or its neighboring ontologies (i.e., related ontologies in the ontology context of the starting point ontology).

A number of factors may be considered in determining whether a term is an appropriate match of an input word. One factor is that the term's local name should be able to share the same meaning with the input word. In the instance multiple such terms exist, a factor to consider in determining whether a term is an appropriate match of an input word is how strongly the term's ontology is connected with the starting point. Another factor is the global popularity of the term. While the global popularity of a term may not be equal in importance to the local popularity, the global popularity can elevate the chance of the term being selected because more popular terms may imply they are more widely accepted. Thus, using popular terms to encode data may benefit in making the data more visible to other users.

However, due to the difficulty of automatically determining by a computer, processor, system, or device whether the local name of a term can share the same meaning with the input word or short phrase, there is a need to select only the terms whose local names are synonyms of the input word or short phrase from the local semantically-related term list and then compare on those terms' other properties to find the most appropriate term. To address this issue, a similarity measurement for measuring how closely a term's local name is semantically related with the input word or short phrase is considered as another factor herein.

In some embodiments, a single formula that combines all three factors above is used to rank the local semantically-related term lists. The ranking is used to provide the most appropriate terms in the top locations. However, no guarantee can be made that the top ranked results (i.e., terms) are definitely correct matches since a correct match might not exist in the ontology context.

The ranking formula is given by:

$$\text{match score} = sim^6 \cdot \text{corr} \cdot \text{term rank} \cdot g\left(\text{corr}, \frac{1}{\text{pop}}\right). \quad (2)$$

where the sim parameter is a measurement showing the extent to which the term's local name is semantically related with the input word or short phrase and is mainly based on the lexical similarity calculation; corr is a conditional probability that the term's ontology can be seen if the starting point ontology is already presented in an RDF document; term rank is the global popularity of the term represented as a float number varying in the range about $(0, 10^7)$ with a larger number indicating a higher rank; pop is the popularity of the starting point ontology; and g is the correlation effect magnification function (explained in greater detail below). Sim is weighted using high polynomial to reflect the dominate role it plays in determining the match score.

While there may be other methods to measure word similarity (e.g., such as Google similarity distance), some embodiments herein calculate a similarity that is a positive value no larger than two (2) to indicate the chance that the local name of a term would share the same meaning with an input word. The method is primarily based on lexical similarity. If the comparison is performed between two words, the similarity score is a baseline score of 1 plus a match ratio ranging from [0,1] set by measuring the lexical similarity between the word and the term (i.e., the length of the matched text divided by the length of the longer word). The baseline score is for synonym's sake because a synonym may share no lexical similarity with the input word. If the comparison is performed between two phrases, the similarity score is based on the number of matched keywords divided by the total number of key words in the local name of the term. However, the similarity score between two phrases is properly adjusted so that it falls in the same data range as the similarity score between two words does.

Figure 5:
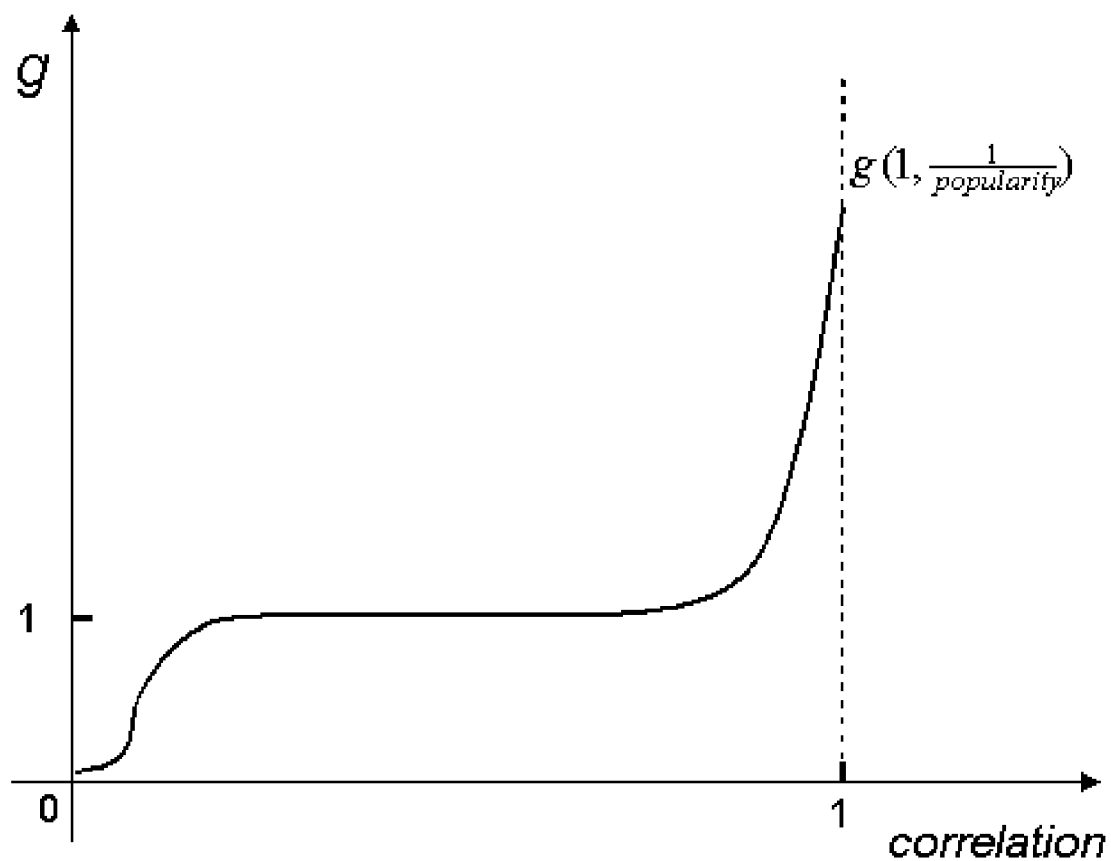
FIG. 5 is a block diagram of a system, according to some embodiments.

When dealing with terms having the same or a close similarity (sim) score, only relying on (corr·term rank) factor of equation (2) to further rank the terms is not sufficient. A term with a very high term rank should be degraded or discarded if its ontology has a trivial correlation (corr) with the starting point (i.e., central) ontology. For example, the term can be a noisy term caused by a mis-connected ontology. Alternatively, a term with even a very low term rank can be desired if its ontology has a very high correlation with the starting point. That is, the effect of correlation (corr) should be magnified when the correlation is around zero (0) or one (1). This aspect may be accomplished by multiplying (corr·term rank) with $$g\left(\text{corr}, \frac{1}{\text{pop}}\right),$$

which is a piecewise pop function to approximate the curve 500 shown in FIG. 5. FIG. 5 is an illustrative curve depicting the effect of the correlation around 0 and 1. Curve 500 can be viewed as a single slice of g with a fixed popularity. However, the popularity can be used to adjust the curve when correlation is around 0 and 1. The degree of the magnification, i.e. the slopes of curve 500 near around the two ends, is set to be inversely proportional to the popularity of the starting point. This relationship is used since the terms defined in a less popular starting point ontology tend to have lower ranks and therefore need additional magnification to compete with other terms. On the other hand, up-limiting the degree of the magnification helps the terms with a very high popularity and considerable correlation to have the chance to rank first, such as rdf:type, dc:title, dc:date, geo:lat and cc:License.

In some instances it may be hard to determine the "best" choice between a local term with a high correlation and a general term with a high popularity and considerable correlation but the methods and systems herein may operate to at least elevate the "best" choices to top result locations.

As used herein, the terms with the highest match scores (i.e., equation (2)) are the most appropriate terms that can be matched with an input word or short phrase within the ontology context of the starting point. In some embodiments, a small number (e.g., three) of the top terms for each input word may be selectively kept and placed, in ranked order, in a candidate term list. The highest ranked term in the candidate term list may be referred to as the default term. In some embodiments, the leftmost term in the candidate term list is the default term, although other listing configurations may be used.

An example of psuedo code related to operation 310 of FIG. 3 for appropriate terms is provide as follows:
Find-Appropriate-Terms(startingPoints, wordset, termSets)
Input: startingPoints is the set of starting points $\{p_0, p_1, \ldots, p_k, \ldots, p_{m-1}\}$ wordSet is the input set of words $\{w_0, w_1, \ldots, w_i, \ldots, w_{n-1}\}$ where wi is a pair of <word, type>.
Output: termSets is the array of term sets, where a term set is the array of candidate term lists.

```
1   for each starting point p_k ∈ startingPoints
2     for each w_i ∈ wordSet
3       termSets[k].candidateTermLists[i] =
          Find-Appropriate-Terms-For-Individual-Word (p_k, w_i)
4     Reduce-Namespaces (termSets[k]);
5   return termSets
```

Find-Appropriate-Terms-For-Individual-Word ($p_k$, $w_i$)
Input: $p_k$ is a starting point. $w_i$ is an input word.
Output: the candidate term list for $w_i$ within the ontology context of $w_k$ 1 get semantically related term list list$_i$ from pair-wise term list for $w_i$
2 scan list$_i$ and pick only terms whose namespace is $p_k$ or a neighbor of $p_k$ according to co-occurrence relations in ontology co-occurrence network, OCON, to form local semantically related term list localList$_i$
3 sort the localList$_i$ according to equation (2)
4 put the top 3 terms (or other number of terms) in localList$_i$ to a candidate term list (the particular number of terms may vary and may be determined, set, or otherwise selected based on a number of factors including, for example, desired results, computational resources, etc.)
5 return the candidate term list While a term list has been determined, the default term in each candidate term list is not, in some embodiments, used to form the most appropriate term set matching the input words. The candidate term list is generated based on the local information of each individual term. However, in some embodiments there is a constraint to consider the relationship between terms in the term set. The constraint is to reduce the number of namespaces used by the terms in the term set. This constraint is provided for two reasons. First, people tend to use vocabulary from as few as possible namespaces to author an RDF document. Secondly, it is beneficial that the most popular terms in different semantics can converge on several ontologies but not be distributed on many ontologies in an ontology context.

In an attempt to reduce the total number of namespaces involved, the options other than the default term in the candidate term list are considered in composing a term set. However, considering the other options may introduce additional complexities. For example, a term may have too good of a match score to be replaced by the other options, even if it is the only term from its namespace in the term set and its competitor has already many brothers. Thus, the trade-off of match score for a namespace converge should be done under a certain condition. Accordingly, a measurement, called converge score, is provided for measuring the degree of convergence for the namespaces used in a term set. The converge score is given by:

$$\text{converge score} = \sum_{i=2}^{n} a_i^2. \quad (3)$$

where n is the total number of different namespaces in the term set, $a_i$ is the number of terms using the namespace i in the term set, and size is the number of terms in the term set. Furthermore, the sum of the number of terms in the namespace of each term set over all term sets is the size, as noted by:

$$\sum_{i=1}^{n} a_i = \text{size} \quad (4)$$

The number of all possible term sets composed by picking one term from each different candidate term list is the cube of the quantity size. Therefore, finding the optimal term set by evaluating each possible term set is computationally expensive. To help alleviate this problem, a greedy "hill climbing" algorithm is adopted. With the set of all of the default terms having the highest match score sum, a "move" is made to swap a default term with one of the other two "candidate" term options. In making the "moves", a best "move" is made until no positive moves can be obtained. In order to determine the "best" move, a possible (2·size) moves are made. The move score$_{(i,0)-(i,j)}$ of swapping the default term 0 and the term j in the candidate term list i is given by the following formula:

$$\text{converge score} - \tan\left(\frac{\pi}{2} \cdot \frac{-\Delta\text{match score}}{\max(\text{match score}_{(i,0)}, \text{match score}_{(i,j)})}\right). \quad (5)$$

where $0 \leq i$ size, $1 \leq j < 3$. A principle of the "move" function is that the loss of match score can be compensated by the gain of converge score if the ratio of match score$_{(i,j)}$ to match score $_{(i,0)}$ is significant. Herein, the tangent function $$\tan\left(\frac{\pi}{2}x\right)$$

in equation (4) is a transform used because it grows almost linearly when x is under 0.5, grows faster thereafter, and grows abruptly only when x is approaching one. This characteristic can be utilized in constructing the "move" function to fit with our principle of "move". Another transform with similar properties may be used to take its place.

After the "hill climbing" procedure terminates, the default terms from each candidate term list is used to construct the default term set that contains the most appropriate terms within the ontology context matching the input words.

An example of psuedo code related to reducing the number of different namespaces is provide as follows:
Reduce-Namespaces (termSets[k])
Input: termSets[k] is the term set for the starting point $P_k$.

Output: termSets[k] after reducing the number of namespaces used by the terms in termSets[k].candidateTermLists[i].elementAt(0) for i between 0 and n−1.

```
1  do
2    evaluate 2*n moves using move score equation (5) and maintain the
       "move" with the highest move score.
3    realize the "move" with the highest move score if the score is
       positive.
4  while (the highest "move" score is positive)
```

Each starting point is used in operation 310 to return a default term set that will provide a best mapping in the ontology context of the starting point. In order to determine which term set among all of the default term sets is the most appropriate in a Semantic Web scale for the input set of word(s), all of the default term sets obtained from different ontology contexts may be ranked according to a "goodness" function that considers both consistence and popularity at operation 315. The "goodness" function is given by:

$$\frac{pop^{w_1} \cdot \tan\left(cr \cdot \left(\frac{\Pi}{2} - w_2\right)\right) \cdot spcr^{w_3} \cdot \left(\sum_{i=1}^{n} sim_i \cdot corr_i\right)^{w_4}}{spsize^{w_5}} \quad (6)$$

where $sim_i$ is a measurement representing the extent to which $term_i$'s local name is semantically related with the matched input word or short phrase; $corr_i$ is the conditional probability that the $term_i$'s ontology can be seen if the starting point ontology in an RDF document is already seen; pop is the popularity of the starting point ontology, cr is the percentage of the input words that have matching terms in the ontology context, spcr is the percentage of the input words that have matching terms belonging to the starting point ontology, spsize is the number of terms in the starting point ontology, and the tuning parameters $w_i$ are the weights used to adjust the contribution of each factor to the whole formula.

The sum over the product of the term's semantic relation and conditional probability can be seen by the starting point $$\left(\sum_{i=1}^{n} sim_i \cdot corr_i\right)$$

is the accumulated term weights in the context of the starting point, which also considers how well the terms are matched.

It is believed that $$\frac{\left(\sum_{i=1}^{n} sim_i \cdot corr_i\right)^{w_4}}{spsize^{w_5}}$$

alone is a good indicator for measuring the normalized consistency of the target term set. However, when it is combined with popularity (i.e., pop) by multiplication, as well as using the weights $w_1$ and $w_4$ to reach a balance between them, $$\tan\left(cr \cdot \left(\frac{\Pi}{2} - w_2\right)\right)$$

is introduced to promote the term sets that have high cr over those having ordinary cr and introduce spcrto with respect to the term sets that are more related with their starting points. However, while large ontologies may have a high cr and spcr they may still be inferior to "good" competitors from small ontologies because of the effect of spsize factor. That is, smaller ontologies may have a better "goodness" value than larger onotologies with high cr and spcr factors.

Using the calculated "goodness" factor to rank the term sets, a select number of the term sets may be presented or otherwise provided for the consideration of a user. In some embodiments, a top number of the results (e.g., 20 or some other determined or selected quantity, where the quantity may be fixed, dynamically determined, a range between 1 and some larger number, a percentage, etc.) term sets are provided in descending order according to their "goodness" score as output to users.

An example of psuedo code related to ranking the terms is provide as follows:

Rank-Term-Sets(termSets)
Input: termSets is the array of term sets, where a term set is the array of candidate term lists.
Output: top 20 term sets.
1 sort termSets[m] on their default term set using equation (6)
2 return top 20 term sets The problem of mapping natural language or vocabulary input words to ontologies is in some respects, like an information retrieval task because both undertakings find linked data items (schemas or documents) from query words. However, the problem and solution presented herein is significantly different from what a traditional information retrieval system does. Ontologies are schemas, while documents are data files encoded in a schema (natural language).

In some embodiments, the methods and processes of the present disclosure may facilitate mapping natural language words and the terms used by machines so that people can annotate and query their data in a natural, intuitive manner and store the corresponding data in RDF data model(s) using the terms. By using the natural language words, people may be provided greater freedom in the variety of data they can efficiently annotate. Additionally, through the mapping enabled by the present disclosure, users of same may also gain insight into the terms already included and what terms need to be created in the data models. These aspects can benefit the further development of the Semantic Web ontologies and avoid duplicated works.

It is noted the matching mechanism disclosed herein determines that the ontologies whose terms are lexicalized in the most common way people would express them using natural language are more likely to be selected. This feature may also contribute to the further ontology development toward meeting people's common conceptualization of the world.

The various embodiments and processes disclosed herein may be implemented by a computer or machine including a processor, such as for example an information engine providing object-based reporting functionality to client applications. In this regard, processes and methods disclosed herein may be embodied in machine or computer-executable program code or instructions stored on a tangible computer-readable medium. Furthermore, the processes and methods may be implemented by any combination of hardware and/or software.

Embodiments described herein are solely for the purpose of illustration. Those in the art will recognize other embodiments may be practiced with modifications and alterations to that described above.

What is claimed is:

1. A computer-implemented method to map a set of words to a set of ontology terms, the method comprising:
   determining a starting point for each of a plurality of ontology contexts, each of the starting points including terms matching a set of words, the set of words including a plurality of words;
   determining a term set corresponding to the set of words in the ontology context of each of the starting points;
   ranking the starting points and selectively using a predetermined number of the ranked starting points;
   ranking the term sets determined for all of the starting points; and
   providing an output of the term sets in a ranked order.

2. The computer-implemented method of claim 1, wherein each ontology context has a central ontology and the starting points are each a central ontology.

3. The computer-implemented method of claim 1, wherein the set of words each include an associated indication of a type parameter that is one of a class or a property.

4. The computer-implemented method of claim 1, wherein each starting point has a cover rate of the set of words above a predetermined threshold, wherein the cover rate for the starting point is defined as the number of covered words of the set of words by the starting point divided by a total number of the set of words.

5. The computer-implemented method of claim 1, wherein the determining of a starting point further comprises determining a cover rate for an ontology by:
   generating a semantically-related term list for each word in the set of words;
   collecting, in a data structure, all of the different namespaces appearing in the terms in each semantically-related term list generated for each word; and
   determining a number of the set of words covered by a namespace ontology based on the number of occurrences of the namespace in each data structure.

6. The computer-implemented method of claim 1, wherein the ranking of the starting points is proportional to a product of a cover rate and a popularity of the starting points and inversely proportional to a size of the starting points where the cover rate denotes the percentage of the set of words that are covered by the starting point ontology, popularity denotes how many times the starting point ontology is used in a data set of existing RDF documents, and size denotes a number of terms defined in the ontology.

7. The computer-implemented method of claim 1, wherein terms of the determined term set corresponding to the set of words in the ontology context of each of the starting points are determined based on a combination of the terms' similarity to the set of words, a strength of the terms' ontology to the starting point; and a global popularity of the terms.

8. The computer-implemented method of claim 1, wherein a predetermined number of the ranked term sets determined for all of the starting points are provided in the output.

9. The computer-implemented method of claim 1, wherein the ranking of the term sets determined for all of the starting points is proportional to a product of a similarity measurement representative of an extent to which a term of the term set's local name is semantically related with the set of words, a conditional probability that the term can be seen in the instance a starting point ontology in an RDF document is already seen, and a popularity of the starting point ontology; and is inversely proportional to a quantity representative of the number of terms in the starting point ontology.

10. The computer-implemented method of claim 1, wherein the set of words are free-form vocabulary words without any restrictions on form, syntax, and structure.

11. The computer-implemented method of claim 1, wherein the staring points are derived from data collected from a Semantic Web.

12. A non-transitory computer-readable medium having stored thereon program code, the program code executable by a computer to:
   determine a starting point for each of a plurality of ontology contexts, each starting point including terms matching a set of words, the set of words including a plurality of words;
   determine a term set corresponding to the set of words in the ontology context of each starting point;
   rank the starting points and selectively using a predetermined number of the ranked starting points;
   rank the term sets determined for all of the starting points; and
   provide an output of the term sets in a ranked order.

13. The computer-readable medium of claim 12, wherein each ontology context has a central ontology and the starting points are each a central ontology.

14. The computer-readable medium of claim 12, wherein each starting point has a cover rate of the set of words above a predetermined threshold, wherein the cover rate for the starting point is defined as the number of covered words of the set of words by the starting point divided by a total number of the set of words.

15. The computer-readable medium of claim 12, wherein the determining of a starting point further comprises determining a cover rate for an ontology by:
   generating a semantically-related term list for each word in the set of words;
   collecting, in a data structure, all of the different namespaces appearing in the terms in each semantically-related term list generated for each word; and
   determining a number of the set of words covered by a namespace ontology based on the number of occurrences of the namespace in each data structure.

16. The computer-readable medium of claim 12, wherein the ranking of the starting points is proportional to a product of a cover rate and a popularity of the starting points and inversely proportional to a size of the starting points where the cover rate denotes the percentage of the set of words that are covered by the starting point ontology, popularity denotes how many times the starting point ontology is used in a data set of existing RDF documents, and size denotes a number of terms defined in the ontology.

17. The computer-readable medium of claim 12, wherein terms of the determined term set corresponding to the set of words in the ontology context of each of the starting points are determined based on a combination of the terms' similarity to the set of words, a strength of the terms' ontology to the starting point; and a global popularity of the terms.

18. The computer-readable medium of claim 12, wherein a predetermined number of the ranked term sets determined for all of the starting points are provided in the output.

19. The computer-readable medium of claim 12, wherein the ranking of the term sets determined for all of the starting points is proportional to a product of a similarity measurement representative of an extent to which a term of the term set's local name is semantically related with the set of words, a conditional probability that the term can be seen in the instance a starting point ontology in an RDF document is already seen, and a popularity of the starting point ontology; and is inversely proportional to a quantity representative of the number of terms in the starting point ontology.

20. The computer-readable medium of claim 12, wherein the set of words are free-form vocabulary words without any restrictions on form, syntax, and structure.

21. The computer-readable medium of claim 12, wherein the staring points are derived from data collected from a Semantic Web.

* * * * *